Dec. 27, 1955  H. S. BASSET  2,728,726
TREATMENT OF WATER WITH MAGNESIUM AND SULFUR DIOXIDE
Filed May 5, 1952
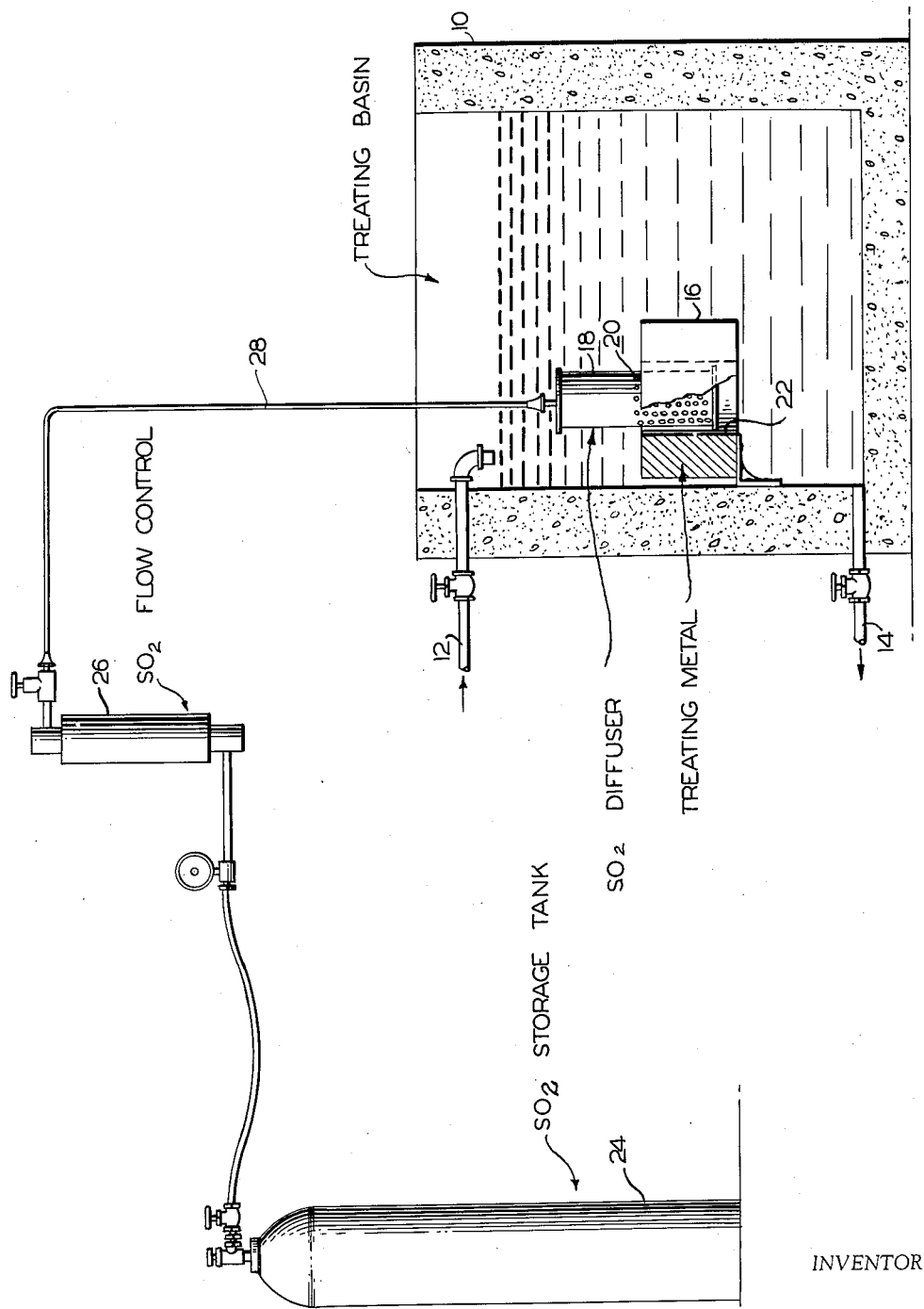
INVENTOR
HARRY S. BASSET
BY Cushman, Darby & Cushman
ATTORNEYS

United States Patent Office 2,728,726
Patented Dec. 27, 1955

2,728,726

TREATMENT OF WATER WITH MAGNESIUM AND SULFUR DIOXIDE

Harry S. Basset, Waco, Tex.

Application May 5, 1952, Serial No. 286,173

7 Claims. (Cl. 210—23)

This invention relates to the treatment of water containing minerals for the control of scale, algae and corrosion. For example, this invention provides a new and novel process for the treatment of water used in heat transfer operations in order to eliminate existing scale and algae formations, to prevent further scale formation, and at the same time, inhibit corrosion.

Another important application of the process of this invention is to prevent plugging of salt water disposal wells and to inhibit corrosion in pipes used in these disposal systems in the oil industry.

In most heat transfer operations involving heating or cooling with water, the water is passed, either by forced circulation, free convection or gravity, over a solid surface separating the water from the material, which is usually a liquid or a gas whose heat content is to be altered. Objectionable scale deposits form on such surfaces for at least two reasons. Where sufficient rise in temperature takes place, normally soluble bicarbonates of calcium and magnesium are converted to insoluble carbonates. Where the water is recycled and the volume decreased by evaporation, the concentration of the dissolved salts or minerals exceeds their solubility.

The most important cations causing scale are calcium and magnesium. Silicates, carbonates and sulfates are the important anions. These are deposited as calcium silicates, carbonates and sulfates, and magnesium silicates and carbonates. All natural waters contain some or all of these dissolved or suspended impurities, and the extent of the difficulties encountered in using the water depends upon the initial concentration, the build-up in concentration due to recycling, the particular combination of impurities, and the operating temperature.

Various methods have been employed to prevent scale formation and to remove the scale already present in heat exchange systems. The well known ion exchange method, in which the ions forming the insoluble compounds are replaced by ions which form soluble compounds, is effective, but requires extensive equipment and is expensive where large quantities of hard water must be treated. Acidulation can be employed, but its use is hazardous to both personnel and equipment, and requires close control to prevent subsequent corrosion. Various organic compounds, both naturally occurring and synthetic, also have been used alone and in combination with acids, phosphates and the like. All these treatments, so far as is known, have inherent limitations and objectionable features.

Of the objectionable features of the above methods, perhaps the most objectionable is the large volume of suspended solids resulting from chemical synthesis. To limit the precipitation of these solids in order to prevent them from acting as insulating media on heat exchange surfaces and as flow restrictions within pipes, it is necessary to limit the cycles or concentrations of these solids by dilution with fresh unconcentrated water. From the turbidity of the waters treated in accordance with this invention, as will be seen from Examples 1 to 5, appearing hereinafter, it is evident that this invention affords the solubility, for example, of the ion exchange method, and not conversion to a suspended salt whose concentration eventually builds up to an extent that precipitation occurs.

Salt water or brine from the treaters and/or separators employed in petroleum production fields must be disposed of in a manner which will not contaminate surface waters. Two methods are generally employed for this purpose. The first is the open system, in which the water is discharged from the treaters into a pit for storage and is subsequently pumped into an injection or disposal well. The second, known as the closed system, conducts the brine directly from the treaters into the disposal well without contact with the atmosphere. In both systems, considerable difficulty from corrosion and/or calcium deposits is experienced. In the open system, the ferrous metal, either naturally occurring or introduced into solution by the corrosive action of the brine, is oxidized to the ferric form by exposure to the atmosphere. Sand formations forming the underground reservoir filter out this suspended iron, with the result that the solids gradually restrict or stop the flow of brine. In both systems, shut-downs for cleaning wells are expensive, and can even necessitate a shut-down of the productive wells if severe plugging occurs. Standard practice is to employ hydrochloric acid for cleaning the shut-down wells. Such treatment, with the necessary delay involved, is objectionable, both from the standpoint of personnel and equipment involved.

The present invention, in brief, comprises a process wherein a metal high in the electromotive series is introduced in a body of water to be treated and is subjected to a stream of sulfur dioxide, which impinges on the immersed metal, whereby the salts normally causing scale deposits are rendered considerably more soluble, algae formation is prevented, the plugging of disposal wells is prevented, and corrosion of the metal in the various systems under consideration is inhibited.

The theoretical explanation of the chemistry of the process of this invention is not clear. It may be that the metal high in the electromotive series, for example, magnesium, forms a complex salt which greatly increases the solubility of the normally occurring salts which cause scaling problems. Insofar as the protection against corrosion is concerned, no satisfactory theory upon which operability may be based has been deduced, although there is some evidence of the formation of a mono-molecular film of the metal high in the electromotive series on the scale-free metal surfaces of the treated system. As to the explanation of the prevention of the plugging of salt water disposal wells, it has been suggested that the $SO_2$ reduces the iron to the ferrous state and that the complex magnesium salt believed to be formed functions to retain the iron in this form for extended periods. This ferrous state of iron is considerably more soluble than the ferric state, and plugging is thus prevented. However, regardless of the exact theory involved, the examples appearing hereinafter completely show the operability of the process and its high effectiveness.

The drawing forming part of this specification and partially in cross section diagrammatically illustrates apparatus suitable for use in the process of this invention.

In carrying out the process, metal high in the electromotive series, such as magnesium or zinc, is introduced in the water to be treated. The term "water," as used in the claims hereinafter, includes within its scope both water as used in heat transfer equipment and salt water or brine as used in salt water disposal well systems. $SO_2$ liberated preferably through a diffusing device is impinged against this metal, which is in turn thrown into solution. In the case of highly alkaline waters which cause scale and corrosion problems in heat transfer systems, a sufficient amount of $SO_2$ should be introduced to reduce the pH to between about 7.0 and 7.8. Where existing scale deposits are to be removed from heat transfer equipment, a lower pH range, for example, between 4.7 and 7.0 is preferable. In the case of preventing the plugging of salt water disposal wells, a sufficient amount of $SO_2$ should be introduced to reduce the usual pH of between about 6.5 and 7.5 to a range of about 5.6 and 6.5. Where existing scale deposits are to be removed from salt water disposal wells, a lower pH range, for example, between 4.7 and 5.5, is initially desirable. In this connection, a pH of 3.0 has been employed for periods of 36 hours without appreciable corrosive action on badly scaled disposal lines. It is, of course, to be appreciated that the varying mineral content of the waters throughout the world will present differing problems, and consequently, the pH ranges set forth above are merely illustrative of the average conditions encountered.

The amount of metal high in the electromotive series to be utilized will, of course, be dependent upon the amount of $SO_2$ employed, which is determined by the amount of $SO_2$ necessary to reduce the pH to the desired value, as set forth above. In this connection, the use of a metal high in the electromotive series in conjunction with $SO_2$ reduces the demand for $SO_2$ to obtain a desired lower pH. For example, approximately one pound of $SO_2$ is required to reduce the pH of 15 barrels of brine from 7.2 to 6.1. When magnesium is used with the $SO_2$, one pound of $SO_2$ will reduce the pH of approximately 37 barrels of brine from 7.2 to 6.1. Similar results are obtained in systems employing fresh water as a circulating medium.

Of the metals which have proved satisfactory for the process of the present invention, it is preferred to use those metals above chromium in the electromotive series. Zinc and magnesium are particularly effective, and magnesium is the preferred metal, since no degradation products result through its use.

In the drawing is shown one form of an apparatus suitable for use in the process of the present invention. The treating basin 10, which may be, for example, of concrete, is provided with water inlet and outlet means 12 and 14, respectively. The metal high in the electromotive series which is immersed beneath the surface of the water to be treated is indicated at 16, and as shown, is in the form of an annular-shaped body. For the purpose of impinging sulfur dioxide gas against the metal 16, an $SO_2$ diffuser 18, which is cylindrical in shape and of a diameter permitting its insertion within the opening 22 of the metal 16, has proved highly satisfactory. Openings 22 in the wall of the diffuser permit the escape of the sulfur dioxide in direct contact with the metal 16. The sulfur dioxide, as illustrated, is supplied from a storage tank 24, and is directed to the sulfur dioxide diffuser 18 through a flow control device 26, which permits a regulated volume of gas to pass into solution per unit of time. In view of the nature of sulfur dioxide, it is desirable to use a plastic made from polyvinylidene chloride via ethylene and chlorine, or trichlorethylene and vinylidene chloride which has the trade name Saran, stainless steel or copper tubing 28 for transferring the gas from the storage tank 24 to the diffuser 18.

Although, as illustrated, the metal 16 is in an annular form, it is often convenient to utilize the metal in powdered form, rather than as a solid block or annular form.

The following examples are presented for the purpose of more clearly illustrating and explaining the invention.

*Example 1*

In an induced draft cooling tower, circulating 100 gallons per minute and employing a daily makeup of 1,200 gallons, fresh water having a soap hardness of 10 grains per gallon and a pH of 8.5 was employed. The makeup water was treated with $SO_2$ and magnesium using an apparatus similar to that illustrated in the drawings. Sufficient $SO_2$ was employed to reduce and maintain the pH at 7.2, and magnesium was utilized at the rate of one ounce for every 200,000 gallons of makeup water.

Operating under the foregoing conditions over a period of 6 months showed no indication of scale formation or corrosion on the atmospheric coils or other parts of the system. Makeup was added only to compensate for evaporation, and there was no dilution of the water in this system during the last 90 days of the 6-month period.

Previously used conventional chemical treatment of the water for this system made it necessary in order to hold down scale formation to practice daily dilution of the circulating water. This was accomplished by drawing off a portion of the concentrated water and replacing it with fresh water having a lower pH.

The water circulated had a turbidity of one, as measured by a standard "Hellige Aqua Tester," and a concentration as follows:

$SO_4^=$—121 grains per gallon
$Ca^{++}$—30 grains per gallon
$Fe^-$—less than one part per million

*Example 2*

An induced draft cooling tower, circulating 3,000 gallons per minute, with a daily makeup of 50,000 gallons, employed fresh water having a soap hardness of 23 to 25 grains per gallon and a pH of 7.1. The low pH of 7.1 was due to the presence of carbon dioxide in the water. This carbon dioxide dissipated as the water circulated through the tower, and a pH value of 8.4 was attained. With conventional chemical treatments, the allowable concentrations were 1½ cycles, and scale formed on the coils within 24 hours after the coils were manually cleaned. Prior to initiating the treatment described hereinafter in accordance with this invention, the circulating water in the system had a soap hardness of 80 grains per gallon, and a pH of 9.4. The coils were coated with scale varying from one-fourth to one-half inch in thickness. The water was turbid, and the tower wood was coated with scale. Corrosion was severe.

The water of this system was then treated in accordance with this invention with sulfur dioxide at the rate of one pound to 1,000 gallons of new water, with a resultant pH of 7.7, and magnesium at the rate of one pound to 1,600 pounds of $SO_2$.

As a result of this treatment, after 4 months of operation, there was no scale formation on the atmospheric coils or other parts of the system, and there was no evidence of corrosion beyond the allowable 0.005 inch per year, common to the industry.

A typical analysis of the circulating water during the operation with this treatment was as follows:

| | Parts per million |
|---|---|
| $Na^+$ | 1,337 |
| $Ca^{++}$ | 608 |
| $Mg^{++}$ | 225 |
| $Cl^-$ | 2,980 |
| $SO_4^=$ | 1,060 |
| $HCO_3^-$ | 61 |
| $CO_3^=$ | 0 |
| $OH^-$ | 0 |
| Dissolved solids | 6,271 |
| Hardness | 2,444 |

Turbidity, 2 (As measured in Example 1).

The corrosion rate across the coils, observed by the use of coupons at different points, was as follows:

| | Inches per year |
|---|---|
| Coupon No. 1 | .0025 |
| Coupon No. 2 | .0027 |
| Coupon No. 3 | .0029 |
| Coupon No. 4 | .0030 |
| Coupon No. 5 | .0023 |

Even under these adverse conditions, the entire unit has remained free from deposits and slime.

Example 3

In a natural draft cooling tower at Beaumont, Texas, circulating 3,000 gallons of water per minute and employing a daily makeup of 50,000 gallons, the water employed had a pH of 7.7 and a salt concentration as follows:

|  | Parts per million |
|---|---|
| $CaCO_3$ | 550 |
| $NaCO_3$ | 236 |
| $Cl^-$ | 740 |

Under conventional chemical phosphate treatment, scale was deposited on the water lines, heat exchangers and oil coolers. Without first purging, the system was treated in accordance with this invention by the addition of sufficient $SO_2$ to maintain a pH of 7.1, and magnesium was utilized at the rate of one pound to each 1,350 pounds of $SO_2$.

As a result of this treatment, at the end of 30 days, the system had been freed of scale and algae, and has remained free since, using the same amount of $SO_2$ and magnesium. In addition, the circulating water is no longer turbid.

Example 4

Brine having a pH of 7.2 discharged from the treaters in a petroleum production field at Thompsons, Texas, and containing hydrogen sulfide and 28 parts per million of iron in solution and suspension without treatment in accordance with this invention, plugged the sand formation in the disposal well to such an extent that it was necessary to stop injection every 14 days and acidify the well with 15% hydrochloric acid.

In accordance with the process of the present invention, this brine was treated with $SO_2$ at the rate of one pound of $SO_2$ to each 1,400 gallons of brine. Magnesium was utilized at the rate of one pound for every 1,400 pounds of $SO_2$. As a result of this treatment, the pH was held constantly at 6.1, and the iron was reduced to and remained in the ferrous state. At the time of commencing this treatment, the sand formation in the well was plugged to such an extent that it would have been necessary to acidify the well. However, acidification was not used, and the treatment opened the well within a period of 36 hours, and it has been unnecessary to acidify the well to the present date.

Corrosion was tested at various critical points in the system. Untreated brine before exposure to oxidation and of a pH of 7.2 resulted in a corrosion loss of 0.0125 inch per year. The same water treated in accordance with the process of this invention, having a pH of 6.1, before exposure to oxidation, yielded a loss of 0.00125 inch per year. The same treated water, after exposure to oxidation by air and sun for 48 hours, and having a pH of 6.1, yielded a loss of 0.00254 inch per year. The allowable rate of corrosion in this industary is 0.005 inch per year.

The daily input of brine is 5,000 barrels. If sulfur dioxide were used alone, oxidation would take place within a very few feet downstream from the point of feed, with resultant plugging of the sand formation in the well. Test runs without the use of magnesium showed the pH to have risen from an initial 6.1 to 6.9 at the outlet from the point of treatment.

Example 5

In the Conroe Field in East Texas, production water having a temperature of 130° F. caused calcium deposits in the disposal lines to restrict the volume of flow to such an extent that frequent acidulation was necessary. For example, an initially clean line, after 60 days' use, had an accumulation of calcium scale approximately one-fourth inch thick when the water employed was treated with a conventional phosphate compound. The normal pH of 6.8 of this water was reduced to a pH of 5.0 by the use of $SO_2$, and magnesium was introduced into solution at the rate of one pound of metal to every 1,500 pounds of $SO_2$. One and one-half hours after the start of the treatment, the accumulated scale had been dissolved. To prevent further deposits of the calcium scale, the pH was then held at 6.5, and the magnesium input was maintained as above. As a result, the brine maintained a clear, sparkling condition, with none of the former discoloration and turbidity.

Chemically, the foregoing method, by the use of a metal high in the electromotive series, reduces the amount of $SO_2$ required to maintain a desired pH range, but it appears that $SO_3$ is not a factor in the treatment, since the systems become static and the pH will remain constant for long periods of time, any iron present remaining in the ferrous state. Further, the undesired cations or anions are not precipitated in the form of salts, but appear to be made highly soluble in view of the presence of a complex salt of the selected metal high in the electromotive series.

The foregoing description of the process of this invention is for the purpose of illustration only, and is not limiting to the scope of the invention which is set forth in the claims, wherein I claim:

1. A process for the treatment of water to inhibit corrosion and to remove and prevent deposits of algae, scale, and the like, which comprises introducing into the body of water to be treated, magnesium and impinging sulfur dioxide on said magnesium.

2. A process as claimed in claim 1 wherein said magnesium is in the form of an annular-shaped block and wherein a stream of sulfur dioxide is impinged on the inner wall of said annular shaped block of magnesium.

3. A process for the treatment of alkaline water circulated in a heat transfer system to inhibit corrosion and to remove and prevent deposits of algae, scale, and the like, which comprises introducing in the alkaline water, magnesium and impinging sulfur dioxide on said magnesium in an amount sufficient to reduce the pH to a range of between about 7.0 and 7.8.

4. A process for the treatment of alkaline water circulated in a heat transfer system to remove existing deposits of algae and scale formations in the heat transfer system and for the subsequent treatment of the circulating water to inhibit corrosion and to remove and prevent deposits of algae, scale, and the like, which comprises introducing in the circulating water, magnesium and impinging sulfur dioxide on said magnesium in an amount sufficient to reduce the existing pH to a range of between 4.7 and 7.0 and for a time sufficient to remove existing deposits of scale, algae, and the like, and thereafter treating the circulating water with magnesium and sulfur dioxide in an amount sufficient to maintain the pH in a range of about 7.0 to 7.8.

5. A process for preventing the plugging of salt water disposal wells which comprises introducing into the brine to be disposed, magnesium and impinging sulfur dioxide on said magnesium in amount sufficient to reduce the pH to a range of about 5.6 to 6.5.

6. A process for removing existing deposits of scale, algae, and the like from salt water disposal wells which comprises introducing into the brine to be disposed, magnesium and impinging sulfur dioxide on said magnesium in an amount sufficient to reduce the pH to a range of about 4.7 to 5.5.

7. A process for removing existing deposits of scale, algae, and the like from salt water disposal wells and preventing subsequent plugging of salt water disposal wells which comprises introducing into the brine to be disposed, magnesium and impinging sulfur dioxide on said magnesium in an amount sufficient to lower the existing pH to a range of about 4.7 to 5.5 and for a time sufficient to remove existing deposits of scale, algae, and the like, and thereafter treating the additional brine to be disposed with magnesium and sulfur dioxide, in an amount sufficient to lower the pH to a range of about 5.6 to 6.5.

References Cited in the file of this patent

UNITED STATES PATENTS

| Number | Name | Date |
|---|---|---|
| 623,105 | Ranson | Apr. 11, 1899 |
| 653,745 | Jewell | July 17, 1900 |
| 1,804,078 | Baden | May 5, 1931 |
| 1,806,499 | Ranney et al. | May 19, 1931 |
| 2,041,397 | Butterworth et al. | May 19, 1936 |
| 2,041,584 | Adler | May 19, 1936 |
| 2,069,621 | Patrick | Feb. 2, 1937 |
| 2,218,053 | Schwabe | Oct. 15, 1940 |
| 2,401,546 | Brown | June 6, 1946 |
| 2,666,027 | Vallett | Jan. 12, 1954 |

FOREIGN PATENTS

| Number | Country | Date |
|---|---|---|
| 12,861 | Great Britain | 1900 |
| 475,180 | Great Britain | 1937 |